United States Patent
Ura et al.

(10) Patent No.: US 7,503,685 B2
(45) Date of Patent: Mar. 17, 2009

(54) ILLUMINATION UNIT AND LIQUID CRYSTAL DISPLAY DEVICE USING THE SAME

(75) Inventors: Toshihiko Ura, Ishikawa-ken (JP); Yoshinori Yasuda, Ishikawa-ken (JP); Makoto Shimizu, Ishikawa-ken (JP); Hiromi Kaneda, Ishikawa-ken (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 241 days.

(21) Appl. No.: 11/457,961

(22) Filed: Jul. 17, 2006

(65) Prior Publication Data

US 2007/0064410 A1    Mar. 22, 2007

(30) Foreign Application Priority Data

Sep. 20, 2005   (JP) .............................. 2005-272544

(51) Int. Cl.
*F21V 7/04* (2006.01)

(52) U.S. Cl. ..................... 362/633; 362/29; 362/30; 362/561

(58) Field of Classification Search ............ 362/29, 362/30, 633, 561
See application file for complete search history.

(56) References Cited

U.S. PATENT DOCUMENTS

| | | | | |
|---|---|---|---|---|
| 6,667,780 B2 * | 12/2003 | Cho | ............................. | 349/58 |
| 6,976,781 B2 * | 12/2005 | Chu et al. | .................... | 362/633 |
| 6,997,582 B2 * | 2/2006 | Yang et al. | ................... | 362/373 |
| 7,178,967 B2 * | 2/2007 | Kim | ........................... | 362/633 |
| 7,226,201 B1 * | 6/2007 | Li et al. | ..................... | 362/633 |
| 2005/0088839 A1 * | 4/2005 | Huang et al. | .................. | 362/31 |

FOREIGN PATENT DOCUMENTS

JP          2003-5157         1/2003

* cited by examiner

*Primary Examiner*—Sandra O'Shea
*Assistant Examiner*—James W Cranson
(74) *Attorney, Agent, or Firm*—Oblon, Spivak, McClelland, Maier & Neustadt, P.C.

(57) ABSTRACT

Illumination unit UT is used for the illumination of an LCD panel 1 from the rear side of the LCD panel 1. Illumination unit UT includes light source 2, rear cover 6 to cover light source 2 and resin frame 7 assembled with rear cover 6. Resin frame 7 is provided with stopper 73 and rib 74 disposed to restrict the movement of stopper 73 perpendicularly to rib 74. Rear cover 6 has first and second apertures 64 and 65 provided correspondingly to receive stopper 73 and rib 74, respectively. Resin frame 7 and rear cover 6 are assembled with each other by the engagement of stopper 73 and rib 74 with first and second apertures 64 and 65, respectively.

10 Claims, 3 Drawing Sheets

ILLUMINATION UNIT AND LIQUID CRYSTAL DISPLAY DEVICE USING THE SAME

CROSS-REFERENCE OF RELATED APPLICATIONS

This application is based upon and claims the benefit of priority from the prior Japanese Patent Application No. 2005-272544, filed on Sep. 20, 2005, the entire contents of which are incorporated herein by reference.

FIELD OF THE INVENTION

This invention generally relates to an illumination unit and, in particular, to an illumination unit used for a liquid crystal display device and a liquid crystal display device using the illumination unit.

BACKGROUND OF THE INVENTION

Since a liquid crystal display (LCD) device has advantages of light weight, thin thickness and low power consumption, such an LDC device has been widely used for information handling equipment, such as personal computers and word processors, and video equipment, such as television receivers and car navigation systems, as a display device. Many LCD devices applied to those applications include an illumination unit that projects light from a rear side of a display panel to achieve a bright display picture.

Here, an illumination unit is classified into an edge light system or a directly-under-disposed system depending on its disposition of a light source. The edge light system, for example, includes its light source disposed at an edge of a light guide plate provided opposite to a display panel. The directly-under-disposed system, however, includes a plurality of straight-line light sources of fluorescent discharge tubes or the like provided behind a display panel and a diffusing plate provided between the display panel and the light sources.

It is easily achievable to make the directly-under-disposed system highly brighter than the edge light system. The former is advantageous because a light emitting surface of the former is more uniform in brightness than that of the latter. Recently, larger size LCD devices have been widely used for TV receivers and much brighter LCD devices are required for them. It is essential to adopt a directly-under-disposed type illumination unit for such demands.

Conventionally the structure disclosed in Japanese Patent Publication No. 2003-5157, for instance, is known as a directly-under-disposed type illumination unit. In the LCD device disclosed in Japanese Patent Publication No. 2003-5157, the illumination unit to project light from the rear side of an LCD panel includes a housing, a light source (lamp), a lamp holder to support the light source, a reflective sheet, an optical diffusing plate to efficiently transfer light projected from the light source to the LCD panel, a resin frame and a rear cover containing the light source, the lamp holder, the reflective sheet and the diffusing plate.

When the illumination unit is incorporated into the LCD device, the resin frame is assembled with the rear cover to contain the light source, the reflective sheet, the diffusing plate or the like. In this case, projecting stoppers formed at circumferential portions of the resin frame are inserted into apertures made at their corresponding portions of the rear cover so that the outer circumference of the resin frame is fixed with the inner circumference of the rear cover.

Such assembly of the resin frame with the rear cover, i.e., screw-less fixity, is useful for 20-inch LCD panels of LCD devices or the like. Since, however, LCD devices such as LCD TV receivers have recently become larger in size, the assembly set forth above is difficult to sufficiently fix them together. More concretely, such engaged components provided for those larger LCD devices are insufficient in strength so that falling shocks of the LCD devices or the like, if applied, may cause problematic disassembly of the engaged components.

SUMMARY OF THE INVENTION

Accordingly, it is an object of the present invention to provide a highly mechanically reliable illumination unit in which a rear cover is so securely fixed to a frame that falling shocks or the like, if applied, does not easily cause disassembly of the rear cover.

It is another object of the present invention to provide an LCD device with such a reliable illumination unit.

An aspect of the present invention is directed to an illumination unit that includes a light source, a rear cover provided to cover the light source, a frame assembled with the rear cover, a stopper provided on either one of the rear cover and the frame, and a rib provided on either one of the rear cover and the frame perpendicularly to the stopper in order for the rib to restrict the stopper to move in a predetermined direction so that the rib and the stopper assemble the rear cover and the frame with each other.

Further, another aspect of the present invention is directed to a liquid crystal display device which includes the illumination described immediately above and a liquid crystal panel provided on a light projecting side of the illumination unit.

If a frame and a rear cover are fixed with engagement of stoppers or the like, falling shocks or the like, if applied, easily release such engagement and cause the rear cover to remove from the illumination unit. According to the present invention, however, the stopper and the rib are engaged with each other in perpendicular directions to restrict their movement. Such engagement of the stopper with the rib mutually restrains the releasing of the rib and the stopper from the illumination unit so that the engagement strength can be significantly improved.

Thus, once the engagement has been made, the stopper and the rib are not easily disassembled from each other, so that falling shocks or the like, if applied, does not easily cause the rear cover to be removed from the illumination unit. Further, since the frame is fixed with the rear cover without any screws, the assembly of the frame with rear cover does not negatively affect its workability but the mere addition of the engaging rib still increases the reliability of the illumination unit.

According to the present invention, since a rear cover is securely fixed to a frame, falling shocks or the like, if applied, do not cause the rear cover to be removed from the frame, so that a highly reliable illumination unit and an LCD device incorporated with the same can be provided.

BRIEF DESCRIPTION OF THE DRAWINGS

A more complete appreciation of the present invention and many of its attendant advantages will be readily obtained as the same becomes better understood by reference to the following detailed descriptions when considered in connection with the accompanying drawings, wherein.

DETAILED DESCRIPTION OF THE INVENTION

Figure 1:
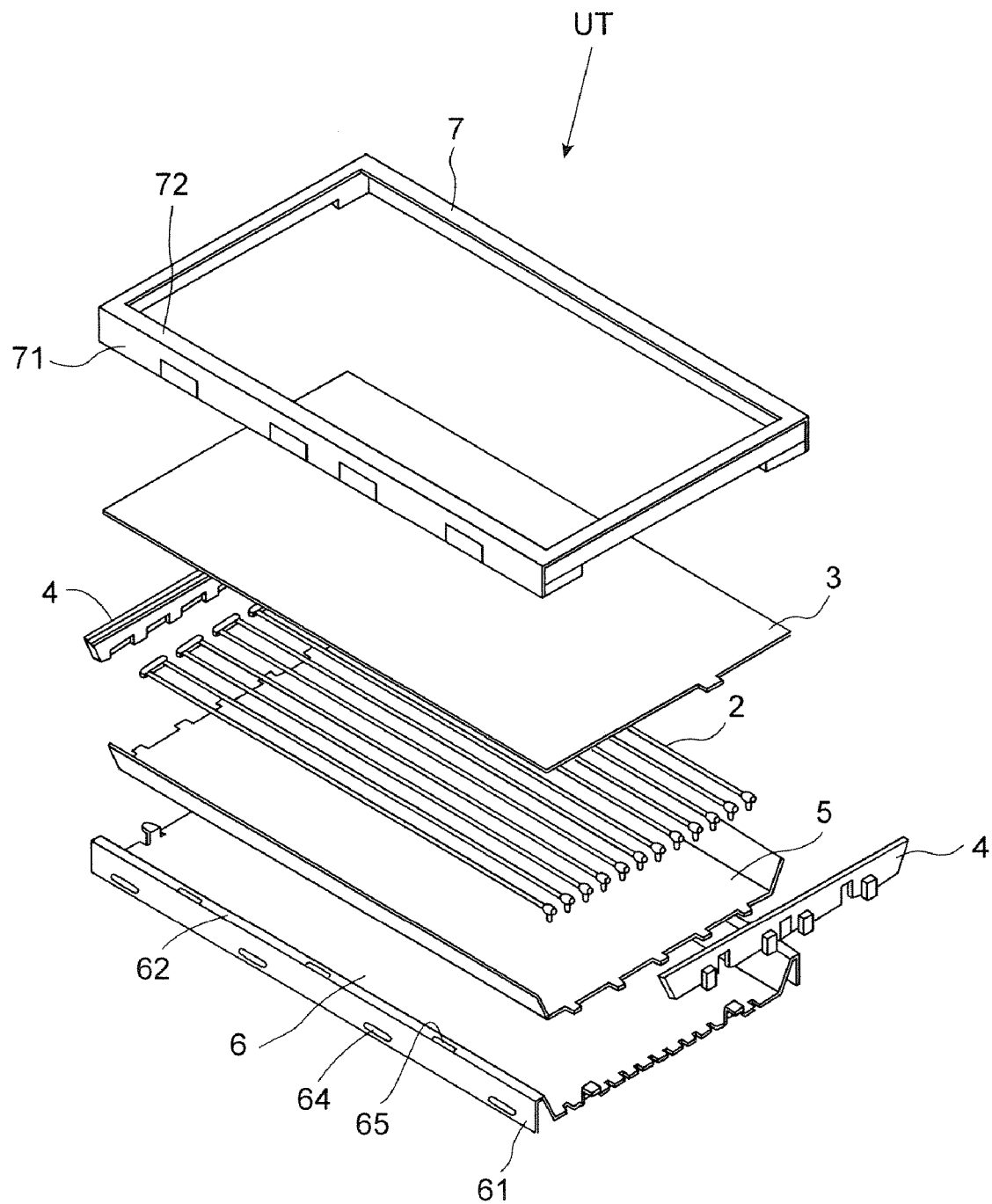
FIG. 1 is a perspective view of disassembled components of an illumination unit in accordance with an embodiment of the present invention.

An illumination unit and an LCD device of the present invention will be described below with reference to the attached drawings. It should be noted that the present invention is not limited to the embodiments but covers their equivalents. Throughout the attached drawings, similar or same reference numerals show similar, equivalent or same components. The drawings, however, are shown schematically for the purpose of explanation so that their components are not necessarily the same in shape or dimension as actual ones. In other words, concrete shapes or dimensions of the components should be considered as described in these specifications, not in view of the ones shown in the drawings. Further, some components shown in the drawings may be different in dimension or ratio from each other.

Embodiment

An embodiment of an illumination unit in accordance with the present invention is assembled in an LCD device as a rear light device. Structure of the illumination unit is shown in FIG. 1.

Illumination unit UT shown in FIG. 1 includes a plurality of straight-line light sources 2, diffusing plate 3 to diffuse light projected from light sources 2, supporting members (lamp holder) 4 to support light sources 2 at both edges, reflective sheet 5 provided behind light sources 2 (on the rear surface side of an LCD panel), rear cover 6 disposed on the rear side of reflective sheet 5 and resin frame 7 to surround and support diffusing plate 3, rear cover 6 and the like.

In illumination unit UT, the plurality of light sources 2 are disposed substantially in parallel with each other at a predetermined lateral interval on the rear side of diffusing plate 3. As light sources 2, straight-tube light sources or ones which are straight, folded at one end and character U-shaped can be used. Here, folded, character U-shaped and two parallel light irradiating straight-tube lamps are used for each of light sources 2. Straight-tube lamps can be fluorescent discharge tubes, for example, that are driven to emit light by high frequency electric currents.

Diffusing plate 3 has the property of diffusing incident light, so that diffusing plate 3 diffuses light from light sources 2 and projects such diffused light to LCD panel 1 (see FIG. 2) uniformly. Supporting members 4 have functions of supporting light sources 2 at both of their ends, further leading the light from light sources 2 to the side of LCD panel 1 and increasing illumination light from the projection surface. Reflective sheet 5 is disposed between light sources 2 and rear cover 6, and has functions of reflecting light emitting from light sources 2 to the rear side, leading the same to LCD panel 1 and increasing illumination light from the projection surface. As reflective sheet 5, a high reflectivity and white resin film or its substitute can be used. Rear cover 6 functions as a supporting member to support light sources 2 and reflective sheet 5 from the rear side as well as a housing member for illumination unit UT.

Figure 2:
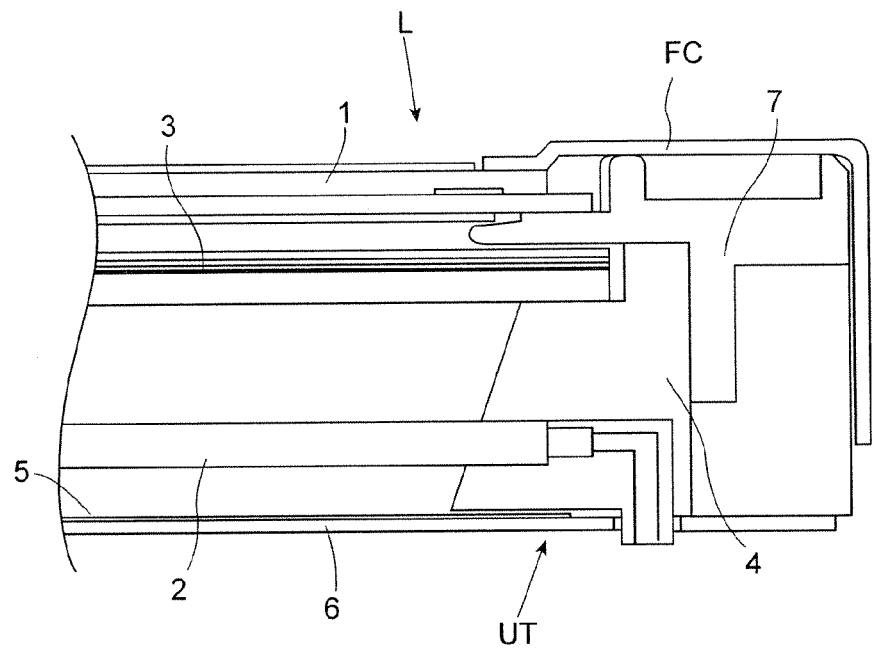
FIG. 2 is a sectional view of portions of an LCD device containing the illumination unit shown in FIG. 1.

As shown in FIG. 2 on the other hand, resin frame 7 is provided to surround diffusing plate 3 and rear cover 6 from their side and front surfaces. Resin frame 7 also has a function of maintaining light sources 2 and diffusing plate 3. Resin frame 7 is made of polycarbonate resin or any suitable substitute.

LCD panel 1 is provided on the front surface of illumination unit UT described above. Metallic front frame FC is set and fixed to assemble LCD panel 1 and illumination unit UT into LCD device L. Light projected from light sources 2 is transmitted onto LCD panel 1, so that LCD panel 1 displays pictures such as characters, video images or the like.

In LCD device L provided with LCD panel 1 on the light projecting side of illumination unit UT, light projected from light sources 2 is collected directly or through reflective sheet 5 and the like, is led to diffusing plate 3 and is then irradiated through diffusing plate 3 onto LCD panel 1. As a result, pictures such as characters, video images and the like are displayed on LCD panel 1.

In such a way as described above, illumination unit UT is assembled into LCD device L. Next, the structure of illumination unit UT will be described in detail below.

As set forth above, illumination unit UT includes light sources 2, supporting member 4 to support light sources 2, reflective sheet 5 provided on the rear side of light sources 2, and rear cover 6 provided on the rear side of reflective sheet 5.

Resin frame 7 includes first frame 71 provided around circumferences of LCD panel 1 and second frame 72 provided perpendicularly to first frame 71 in parallel with LCD panel 1 to support circumferential portions of the outer surface of LCD panel 1. First frame 71 is provided with stoppers 73 while second frame 72, on the other hand, is provided with ribs 74.

Figure 3:
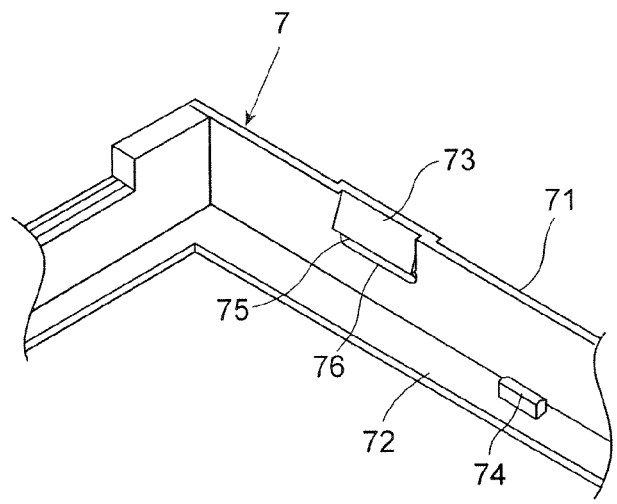
FIG. 3 is a partially perspective view of stoppers and ribs provided at a resin frame of the illumination unit.

As seen from FIG. 3, each stopper 73 of first frame 71 has protrusion 75 projected upwardly and cut-out portion 76 cut out at three sides of a rectangular shape around stopper 73. Thus, elastic force of stopper 73 due to an elastic property of its resin material exerts protrusion 75 in a direction to restore the same to its original position when protrusion 75 is pushed into cut-out portion 76.

Contrary to stoppers 73, ribs 74 are made merely for protrusions on second frame 72, so that their projecting directions are perpendicular to those of protrusions 75.

Figure 4:
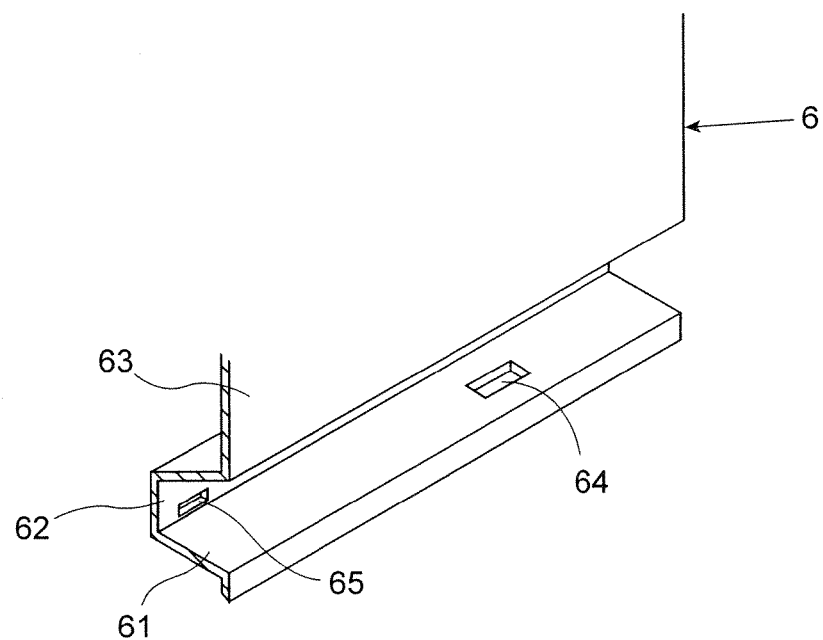
FIG. 4 is a schematic perspective view of first and second apertures made in a rear cover of the illumination unit.

Rear cover 6, on the other hand, includes first and second covers 61 and 62 corresponding to first and second frames 71 and 72 of resin frame 7, respectively, and third cover 63 to cover the back of light sources 2 and the like. As shown in FIG. 4, first aperture 64 is made in first cover 61, corresponding to stopper 73 formed on first frame 71 while second aperture 65 is made in second cover 62, corresponding to rib 74 formed on second frame 72. First and second covers 61 and 62 correspond to first and second frames 71 and 72 of resin frame 7, respectively, and are provided perpendicularly to each other in the same way as first and second frames 71 and 72, so that depth directions of first and second apertures 64 and 65 are perpendicular to each other.

Figure 5:
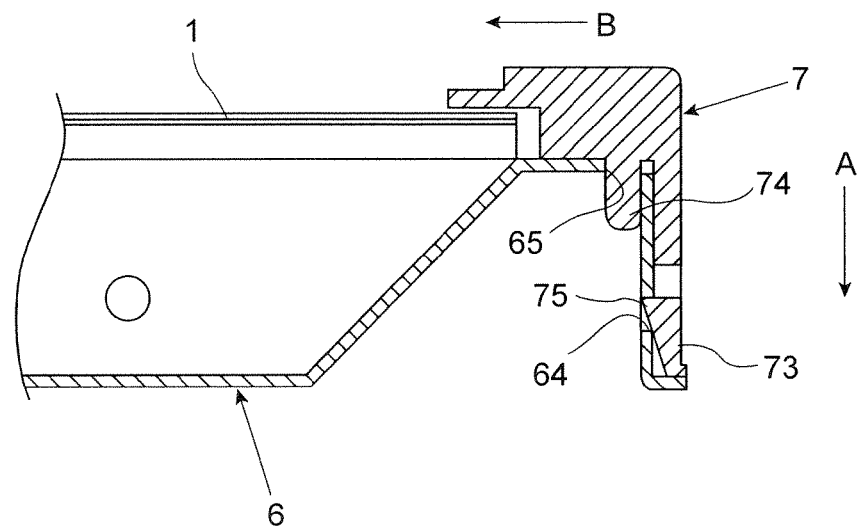
FIG. 5 is a partially sectional view of the illumination unit to show fixity of the rear cover with the resin frame.

When rear cover 6 is assembled with resin frame 7, first, while protrusion 75 is pushed down against the elasticity of stopper 73 provided in first frame 71 of resin frame 7, first aperture 64 made in first cover 61 of rear cover 6 is aligned with stopper 73. The elasticity restores protrusion 75 of stopper 73 to the original position, so that protrusion 75 is set in first aperture 64. At the same time, rib 74 made on second frame 72 of resin frame 7 is inserted into second aperture 65 made in second cover 62 of rear cover 6. In this way, rear cover 6 is put together with resin frame 7. An assembled state of rear cover 6 and resin frame 7 is shown in FIG. 5.

In the state that rear cover 6 is assembled with resin frame 7, protrusion 75 of stopper 73 made in first frame 71 of resin frame 7 is set in first aperture 64 made in first cover 61 of rear cover 6. In this state, protrusion 75 is caught in first aperture 64, so that its movement in the direction indicated by arrow symbol "A" is restricted.

Further, rib 74 made on second frame 72 of resin frame 7 is set in second aperture 65 made in second cover 62 of rear cover 6. In this state, rib 74 is caught in second aperture 65, so that its movement in the direction indicated by arrow symbol "B" is restricted.

Here, if rear cover 6 can be freely moved in the direction indicated by arrow symbol "A", rib 74 is released from second aperture 65 in that direction. If rear cover 6 can be freely moved in the direction indicated by arrow symbol "B", protrusion 75 of stopper 73 is released from first aperture 64 in that direction. As described above, however, since rib 74 restricts rear cover 6 from moving in the direction indicated by arrow symbol "B", rib 74 acts to prevent protrusion 75 of stopper 73 being released from first aperture 64. At the same time, protrusion 75 of stopper 73 restricts rear cover 6 from moving in the direction indicated by arrow symbol "A", protrusion 75 of stopper 73 acts to prevent rib 74 from being released from second aperture 65. In other words, stopper 73 and rib 74 are disposed perpendicularly to each other and act to mutually prevent the release from their engagement, so that their collaboration prevents rear cover 6 falling down from illumination unit UT.

As described above, according to the present invention, since stoppers 73 and ribs 74 are provided on resin frame 7 to maintain the engagement with first and second apertures 64 and 65 made in rear cover 6, such structure, even without screws, achieves highly reliable fixing states. Thus, the engagement strength of rear cover 6 against falling shocks or the like can be improved and rear cover 6 can be prevented from inadvertently falling down.

Alternatively, stoppers 73 and ribs 74 may be provided on resin frame 7 and rear cover 6, respectively, while their corresponding first and second apertures 64 and 65 may be made in rear cover 6 and resin frame 7, respectively, or vice versa. Those alternative structures exhibit substantially the same functions and advantages as for the embodiment described above.

In the foregoing description, certain terms have been used for brevity, clearness and understanding, but no unnecessary limitations are to be implied therefrom beyond the requirements of the prior art, because such words are used for descriptive purposes herein and are intended to be broadly construed. Moreover, the embodiments of the improved construction illustrated and described herein are by way of example, and the scope of the invention is not limited to the exact details of construction. Having now described the invention, the construction, the operation and use of embodiments thereof, and the advantageous new and useful results obtained thereby, the new and useful construction, and reasonable equivalents thereof obvious to those skilled in the art, are set forth in the appended claims.

What is claimed is:

1. An illumination unit comprising:
    a light source;
    a rear cover provided to cover the light source, the rear cover includes a first assembling surface;
    a frame assembled with the rear cover, the frame includes a second assembling surface;
    a stopper provided on either one of the rear cover and the frame; and
    a rib provided on either one of the rear cover and the frame perpendicularly to the stopper to restrict the stopper from moving in a predetermined direction so that the rib and the stopper assemble the rear cover and the frame with each other;
    wherein the first and second assembly surfaces include perpendicular portions, the rear cover includes apertures to receive the stopper and the rib, and the stopper and the rib are provided on the second assembling surface of the frame while the apertures are formed in the first assembling surface of the rear cover.

2. An illumination unit according to claim 1, wherein the frame is made of resin.

3. A liquid crystal display device comprising the illumination unit according to claim 1 and a liquid crystal display panel provided on a light projecting side of the illumination unit.

4. A liquid crystal display device according to claim 3, wherein the stopper is provided to project inwardly from circumferential portions of the liquid crystal display panel and the rib is provided to project from a light projecting surface of the liquid crystal display panel to a back side thereof.

5. A liquid crystal display device according to claim 3, further comprising:
    a diffusing plate, wherein the light source and the diffusing plate are provided on a back side of the liquid crystal display panel.

6. A liquid crystal display device comprising:
    a light source;
    a rear cover provided to cover the light source;
    a frame assembled with the rear cover;
    a stopper provided on either one of the rear cover and the frame;
    a rib provided on either one of the rear cover and the frame perpendicularly to the stopper in order for the rib to restrict the stopper from moving in a predetermined direction so that the rib and the stopper assemble the rear cover and the frame with each other; and
    a liquid crystal display panel provided on a light projecting side of the illumination unit;
    wherein the stopper projects inwardly from circumferential portions of the liquid crystal display panel and the rib projects from a light projecting surface of the liquid crystal display panel to a back side thereof.

7. A liquid crystal display device according to claim 6, further comprising:
    a diffusing plate, wherein the light source and the diffusing plate are provided on a back side of the liquid crystal display panel.

8. A liquid crystal display device comprising:
    a light source;
    a rear cover provided to cover the light source;
    a resin frame assembled with the rear cover;
    a stopper provided on either one of the rear cover and the frame;
    a rib provided on either one of the rear cover and the frame perpendicularly to the stopper in order for the rib to restrict the stopper from moving in a predetermined direction so that the rib and the stopper assemble the rear cover and the frame with each other; and
    a liquid crystal display panel provided on a light projecting side of the illumination unit;
    wherein the stopper projects inwardly from circumferential portions of the liquid crystal display panel, the rib projects from a light projecting surface of the liquid crystal display panel to a back side thereof.

9. A liquid crystal display device according to claim 8, further comprising:
- a diffusing plate, wherein the light source and the diffusing plate are provided on a back side of the liquid crystal display panel.

10. A liquid crystal display device comprising:
- a light source;
- a rear cover provided to cover the light source;
- a frame assembled with the rear cover;
- a stopper provided on the frame;
- a rib provided on the frame perpendicularly to the stopper in order for the rib to restrict the stopper from moving in a predetermined direction so that the rib and the stopper assemble the rear cover and the frame with each other; and
- a liquid crystal display panel provided on a light projecting side of the illumination unit;
- wherein the stopper projects inwardly from circumferential portions of the liquid crystal display panel, the rib projects from a light projecting surface of the liquid crystal display panel to a back side thereof, and the rear cover includes apertures to receive the stopper and the rib.

* * * * *